M. SOWER.
Middlings-Purifier.
No. 169,308.    Patented Oct. 26, 1875.
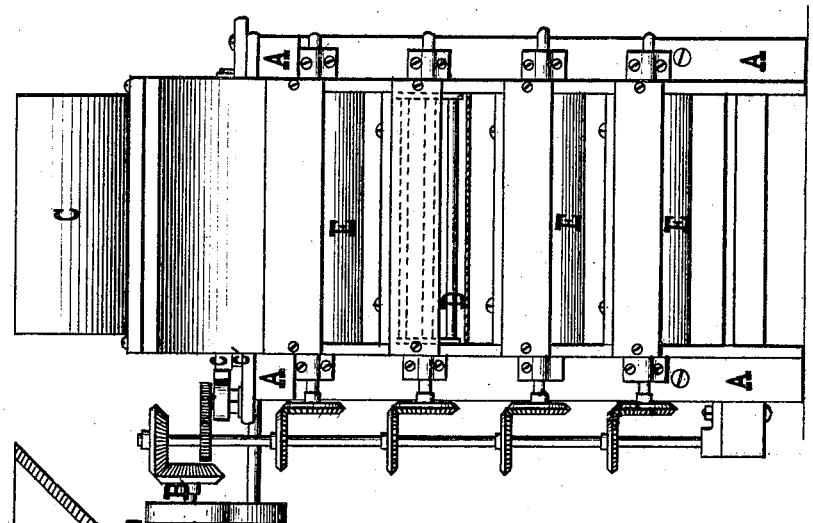
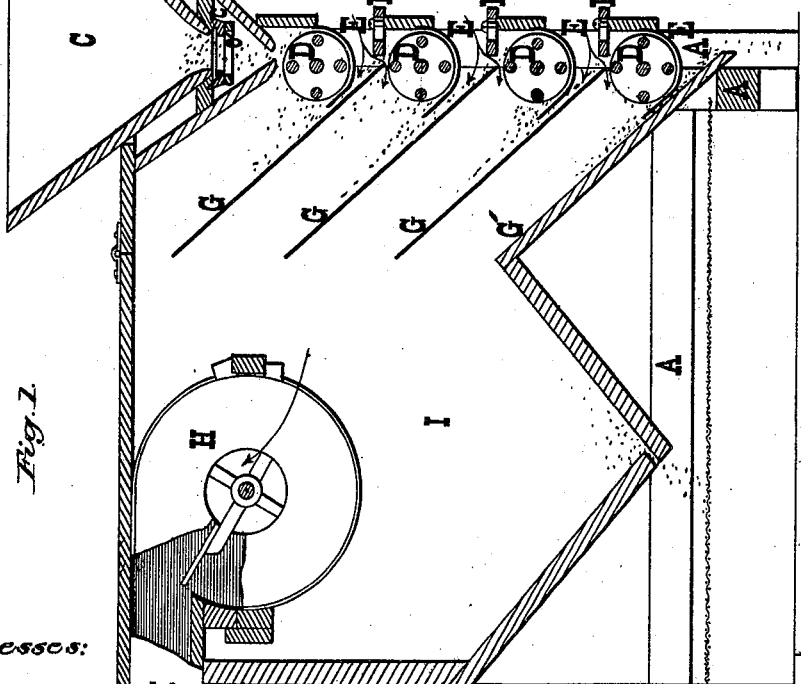

UNITED STATES PATENT OFFICE.

MORRIS SOWER, OF PRINCETON, ILL., ASSIGNOR TO THE SOWER BROTHERS, OF SAME PLACE.

IMPROVEMENT IN MIDDLINGS-PURIFIERS.

Specification forming part of Letters Patent No. 169,308, dated October 26, 1875; application filed June 4, 1875.

*To all whom it may concern:*

Be it known that I, MORRIS SOWER, of Princeton, Bureau county, State of Illinois, have invented an Improvement in Middlings-Purifiers; and I do hereby declare the following to be a full and correct description of the same, reference being had to the accompanying drawings, in which—

Figure 1 is a sectional view, and Fig. 2 is an end view, with parts broken away, showing the reels.

The object of my invention is to facilitate the separation of the branny particles from middlings; and it consists in subjecting the middlings to the action of a series of rapidly-revolving reels, having round, square, or other shaped rods, said reels revolving in concaves or dishes, so as to confine the middlings to the action of the reels, the middlings passing from one reel to another by means of returning boards or chutes, the air from a suction-fan all the while passing both above and below said reels and through the middlings, carrying off the light stuff through a dead-air chamber, leaving the heavier to be collected at proper places below.

In the drawing, A is the frame or support, into which my middlings-purifier is secured; B, the driving-shaft and gearing by which the power is applied to the machine. In the upper part of the frame A is situated the hopper C, into which the middlings are admitted. At the apex of the hopper C are perforated slides $c\ c'$, one or both of which reciprocates by any suitable mechanism; and as the orifices in said slides pass each other the middlings are let through, the feed of the middlings being regulated by the extent that the orifices coincide. Arranged in bearings in the end of the frame A is a series of reels, D D D D, geared to revolve rapidly in the direction of the arrows. Underneath reels D are sheet-metal concaves E, into which the reels D severally revolve, and above each reel is a slide, F, adjusted by means of slots and screws to regulate the amount of air admitted above the reel. From each reel arises, at an angle of about forty-five degrees, a returning board or chute, G, by which the middlings are conveyed from one reel to the next one below, and so on through the whole series, which may consist of four reels, more or less. The chute $G'$, leading from the lowest reel, conveys the middlings out of the machine, where it may be gathered up. Near the top of the opposite side of the frame A, and inclosed within an air-chamber, I, is the suction-fan H, which, receiving motion from the main driving-shaft B, exhausts the air-chamber I, and creates a current of air both above and below the reels D through the agitated middlings, conveying away the light branny particles, and allowing the heavier ones to fall in the hoppered bottom of said air-chamber I, where they may be carried away by a conveyer or dropped upon a cloth frame, as in a former patent of mine.

The operation of my machine is as follows: Middlings being placed in the hopper C, they fall upon the slides $c\ c'$, which reciprocate, and the middlings are allowed to fall through just in proportion as the orifices in said slides are allowed to coincide by any suitable adjustment. The middlings having passed the slides $c\ c'$, they fall upon the bars of the uppermost reel, which, revolving rapidly in the concave E, throws the middlings, with an under throw, up the topmost chute G. The chute G, being sufficiently long to prevent the middlings from being thrown over its upper end, causes them to fall back underneath the concave E upon the second reel D. While the middlings are being thrown up the chute G they are subjected to the action of the air-current caused by the suction-fan H, and the light particles of the middlings are drawn over the upper end of the chute G into the air-chamber I, and the heavier particles fall down the chute upon the next reel below, where the operation is repeated in connection with the second reel. The air is admitted both above and below the reels D, and the amount of air admitted is regulated by means of the horizontal slides F, which may be adjusted according to the circumstances of the case. After the middlings have passed the whole series of reels what still remains upon the chute $G'$ passes out of the purifier below the lower reel, and what has passed over the upper ends of the chutes G, if they have been too heavy to reach the fan H, where they would be blown away, fall into the hoppered bottom of the air-chamber I, and are conveyed away or fall upon an additional screen.

Having thus fully described my invention, what I claim, and desire to secure by Letters Patent, is—

1. In a middlings-purifier, the combination of a suction-fan and a series of returning-chutes with a like series of agitating-reels, substantially as described.

2. The combination of agitating-reels D, concaves E, returning-chutes G, and fan H, substantially as described.

3. The suction-fan H, air-chamber I, and slides F, in combination with reels D, concaves E, and chutes G, substantially as described.

The above specification of my said invention signed and witnessed at Princeton this 29th day of May, A. D. 1875.

MORRIS SOWER.

Witnesses:
J. W. BAILEY,
J. W. STOUFFER.